Figure 7:
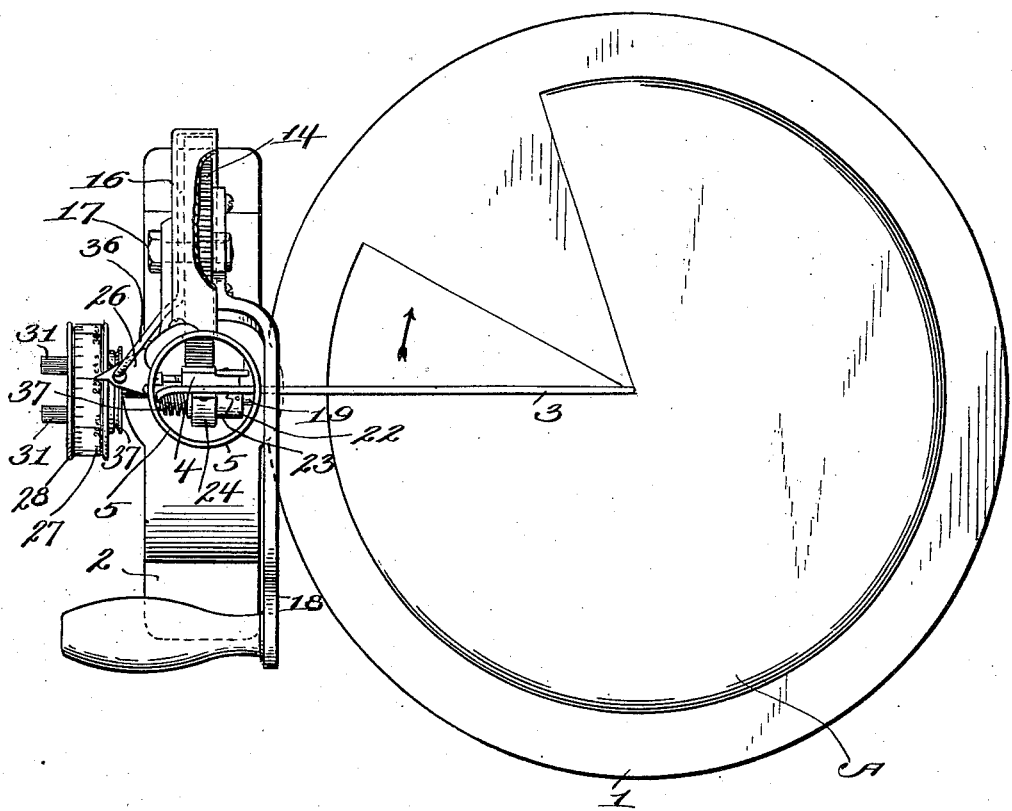

I. E. LEE.
CHEESE CUTTER.
APPLICATION FILED MAR. 6, 1912.
1,041,638.
Patented Oct. 15, 1912.
4 SHEETS—SHEET 1.
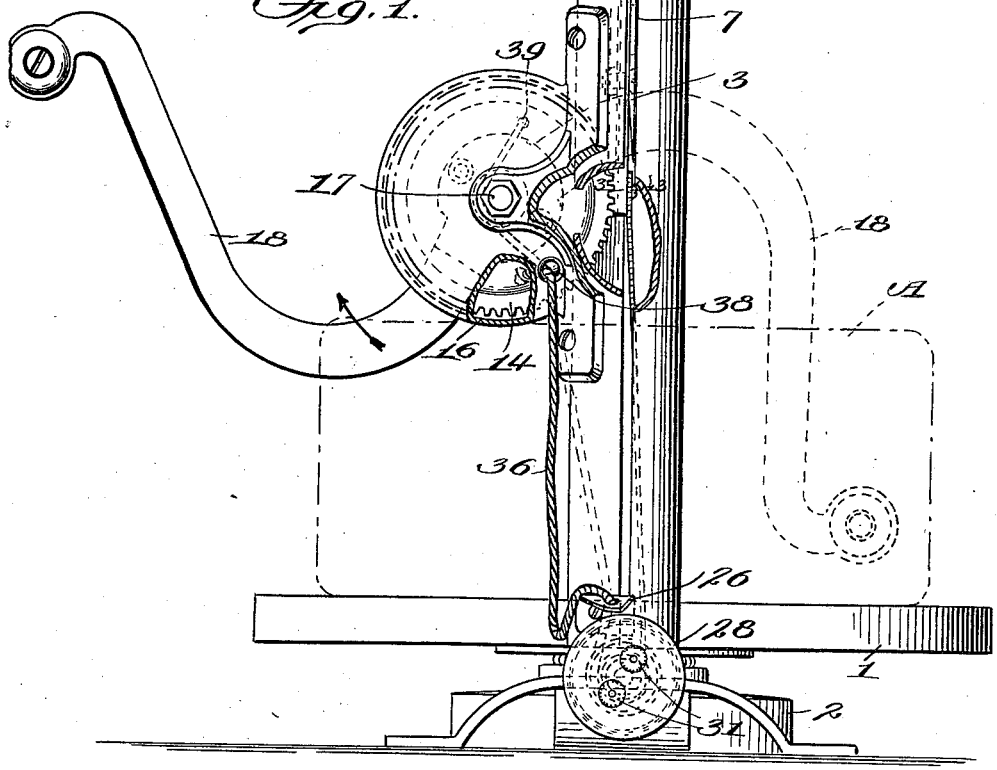

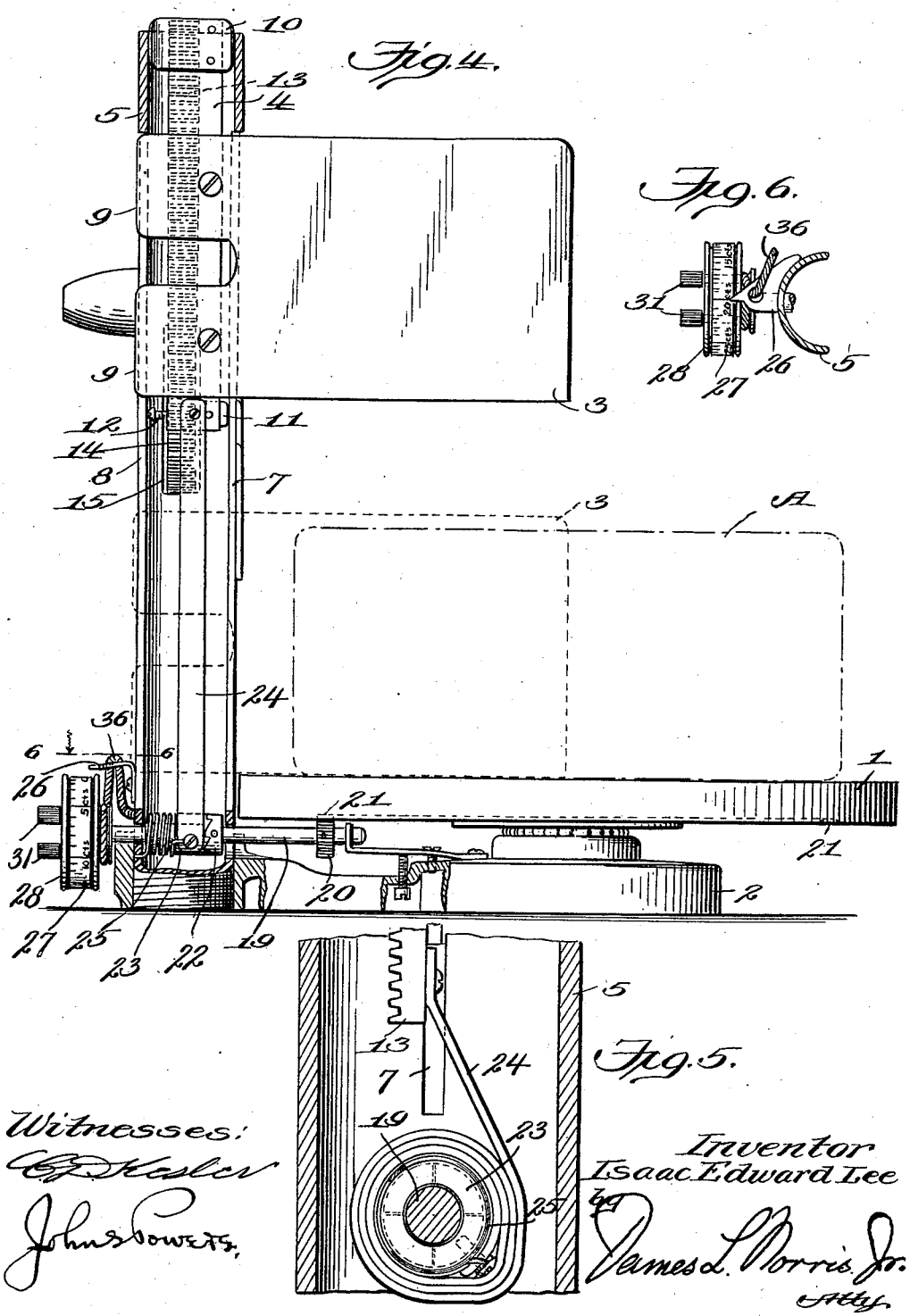

I. E. LEE.
CHEESE CUTTER.
APPLICATION FILED MAR. 6, 1912.

1,041,638.

Patented Oct. 15, 1912.

4 SHEETS—SHEET 3.

Witnesses:

Inventor
Isaac Edward Lee
by
James L. Morris, Jr.
Atty.

I. E. LEE.
CHEESE CUTTER.
APPLICATION FILED MAR. 6, 1912.
1,041,638.
Patented Oct. 15, 1912.
4 SHEETS—SHEET 4.
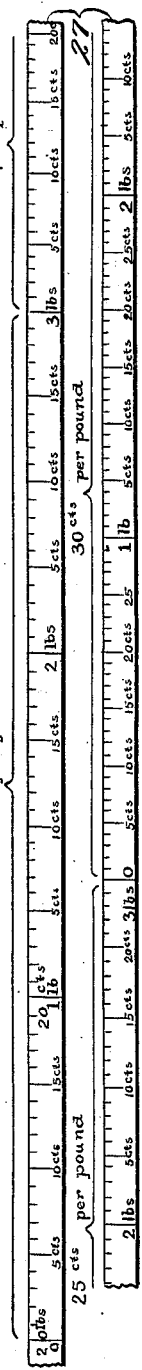
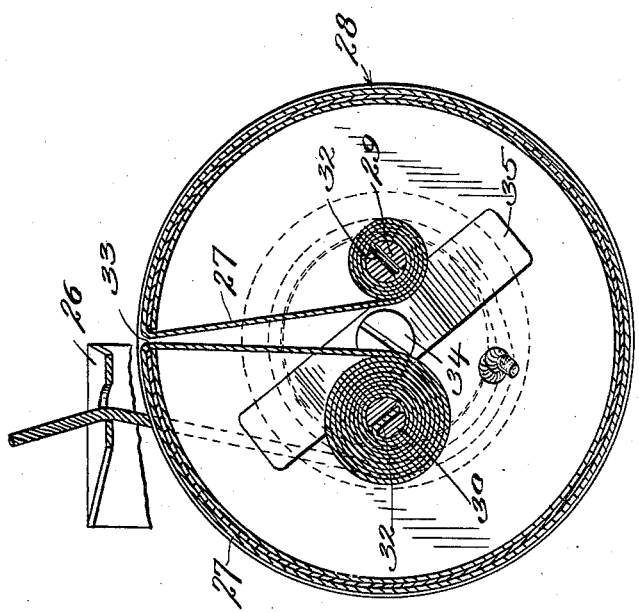
Witnesses:
Inventor
Isaac Edward Lee
by
James L. Norris, Jr.
Atty.

UNITED STATES PATENT OFFICE.

ISAAC EDWARD LEE, OF DAYTON, VIRGINIA, ASSIGNOR OF ONE-HALF TO MAGGIE CHESTER HOUFF AND ONE-HALF TO CHARLES H. ALDER, BOTH OF DAYTON, VIRGINIA.

CHEESE-CUTTER.

1,041,638. Specification of Letters Patent. Patented Oct. 15, 1912.

Application filed March 6, 1912. Serial No. 681,898.

*To all whom it may concern:*

Be it known that I, ISAAC EDWARD LEE, a citizen of the United States, residing at Dayton, in the county of Rockingham and State of Virginia, have invented new and useful Improvements in Cheese-Cutters, of which the following is a specification.

This invention relates to improvements in cheese cutters, of that type wherein a rotatable table is employed as a support for a cylindrical block of cheese, and for coöperation with a knife which cuts the block of cheese into radial slices of desired weight.

In buying cheese at retail, purchasers give their orders both with regard to weight and money value. Thus, one purchaser may request a pound of cheese, and another so many cents' worth. Heretofore this condition has been dealt with either by the use of calculators purely, or of calculators in the nature of predetermining devices, and these calculators are usually comprised of two scales, the one dealing with the weight requested, and the other with the money value requested. The use of these calculators takes up considerable time, increases the number of operations necessary to cutting a slice of cheese, and does not secure accuracy, either by reason of carelessness or error on the part of the operator, or, by reason of the wear of the parts of the calculating device which prevents its accurate operation.

The present invention is designed to overcome these objections, and to enable a slice of cheese of any desired weight or money value to be accurately cut, and by a single operation. Having this object in view, the invention proposes an adjustable scale which may be initially "set," both with regard to the total weight of the block of cheese and of the price per pound at which cheese may be sold on any particular occasion. For example, on one day a grocer may put a thirty pound block of cheese on the table of the apparatus, and the price per pound on that day may be twenty-five cents. On the next day the grocer may put a twenty-five pound block of cheese on the table, and the price per pound may have changed to twenty-eight cents. These variable conditions of weight and value are taken care of by the scale, which, as stated, may be set with regard both to the total weight of the cheese that is used, and to the price at which cheese is selling on a particular day. This scale is provided upon a movable carrier which works with relation to an indicating finger or point, and which is mechanically connected to the lever or equivalent element by which the cheese cutting knife is operated, and also to the gearing which rotates the table. The connections are of such nature that a movement of the operating lever, or its equivalent, to position the cheese cutting knife for an operation thereof, produces both a movement of the table and a movement of the scale carrier; and the degree of movement of the operating lever, or its equivalent, and consequently, of the movement of the table necessary to result in a cut of cheese of a particular value or weight, is determined by the alinement of the indicating finger or point with the reading on the scale, which corresponds to the money value or weight of cheese requested. When the scale has given this reading, the operating lever is then actuated to cause the knife to cut a slice of cheese of the required value or weight, and as the operating lever is thus actuated, its connections with the scale carrier will cause the latter to be reset, and thereby return the scale to the initial position at which it has been adjusted.

An embodiment of the invention is shown in the accompanying drawings, wherein:

Figure 1 is a rear elevation of a cheese cutter in which the features of the invention are incorporated, with parts shown broken away and in section, for convenience of illustration; Fig. 2 is a detail plan view of a standard which serves as a support for certain operating parts and as a guide for the knife; Fig. 3 is a sectional view showing certain details of the knife carrying element; Fig. 4 is a central vertical sectional view, with parts shown in elevation and in a plane at right angles to the plane of Fig. 1; Fig. 5 is a detail sectional view showing an operating shaft and a strap connection between said shaft and the knife carrying bar; Fig. 6 is a detail plan view of the computing mechanism by which the degree of movement of the cheese carrying table, necessary to result in the production of a slice of a particular weight or money value, is indicated; Fig. 7 is a plan view of the improved cheese cutter; Fig. 8 is an enlarged sectional view of the computing mechanism in a plane parallel to the plane of Fig. 1; Fig. 9 is a sectional view of the same feature in a plane at right angles to the plane of Fig. 8; and Fig. 10 is a developed plan view showing, by way of example, different portions of the scale which forms an element of the computing mechanism.

Similar characters of reference designate corresponding parts throughout the several views.

The block of cheese designated by the letter A, and shown in broken lines in Figs. 1 and 4, rests on a table 1, which, in turn is supported for rotation upon a suitable base 2. The block A is cut into slices of definite and determined value by a knife 3, which coacts in this function with the table 1. In the embodiment shown, the knife 3 is carried by a vertical bar 4, which is axially movable with relation to a standard 5. This standard 5 is preferably of hollow, tubular construction, and its lower end may be threaded into a socket or boss which is disposed at the rear of, and forms a part of, the base 2. The bar 4 is disposed within this standard, and the latter is provided with diametrically alined vertical slots 7 and 8, the walls of which serve as a guide for the knife 3, the operating portion of said knife projecting through the slot 7, and rearward extensions 9 of said knife projecting through the slot 8.

It is desirable that the movements of the bar 4 should not be too free, and should be without loose play. For this purpose, said bar is provided at its upper and lower ends, and at relatively opposite sides thereof, with friction shoes 10 and 11, which engage the inner face of the standard 5. The shoe 10 projects at each end beyond the bar 4, but the shoe 11 projects only at one end beyond said bar. At the opposite side of the bar 4, and for the same purpose as the shoe 11, which it adjoins, is a screw 12. This arrangement of the shoe 11 and the screw 12 is adopted because of the presence of rack teeth 13 at that side of the bar 4 to which the shoe 11 is attached. The teeth 13 may either be integral with the bar 4, or they may be formed on a member which is attached to said bar, and the rack which said teeth define is coextensive with said bar, extending from the lower to the upper end thereof.

The movements of the bar 4 are preferably effected by gearing, of which the teeth 13 form a part. The coöperating element of this gearing comprises a pinion 14 which works through a slot 15 in the standard 5, and which is disposed in a casing 16 joined to said standard at one side thereof. The pinion 14 is mounted upon a stud or pin 17, which is secured to the vertical wall of the casing 16. Said casing has an open side (Fig. 7) through which the adjacent flat face of the pinion 14 is exposed, and to this exposed flat face of said pinion the end of an operating crank 18 is attached. It will be apparent from the description thus far given that by turning the crank 18, a vertical movement of the bar 4 is produced, which corresponds in direction to the direction of movement of said crank; and in this way the knife is either raised or lowered, as the case may be.

The invention proposes operative connections between the knife operating means and the table 1, whereby the movements of the knife and of the table are properly coördinated. In the embodiment shown, the bar 4 not only serves as a knife carrier and as an element of the knife operating means, but it also serves as a part of the table rotating mechanism. As shown, this mechanism includes a shaft 19 which extends in a forward and rearward direction, and is journaled in the lower portion of the standard 5, extending diametrically across the latter and projecting at each end beyond the same. That portion of the shaft 19 which extends under the table 1 carries a gear wheel 20, which may be either a pinion or a friction wheel, for engagement with a corresponding gear surface 21, provided on the under face of the table 1. Within the standard 5 the shaft 19 has fixed thereon a clutch member 22, and loose thereon a companion clutch member 23. One end of a strap 24 is secured to the clutch member 23, and the other end of said strap is secured to the lower end of the bar 4. A torsion spring 25 also surrounds the shaft 19, within the standard 5, and has one end fixed to said standard and its other end secured to the clutch member 23, preferably by the screw which secures the strap 24. When the bar 4 moves upwardly, the clutch member 23 will operatively engage its companion clutch member 22, and turn the shaft 19, thereby producing an operative movement of the table 1. On the other hand, when the bar 4 moves downwardly, the clutch member 23 will ride over the clutch member 22, without turning the shaft 19, and consequently, during the downward movement of the bar 4, the table 1 will not be rotated. This last effect is due not only to the relation of the clutch members, but to the fact that the load against which the shaft 19 turns is such that it will not be overcome by the contact of the clutch members, when the clutch member 23 is turned by the spring 25. The object of the spring 25 is two-fold: first, when the bar 4 moves downwardly, it revolves the clutch member 23 and takes up the slack of the strap 24, and second, it maintains the clutch member 23 in operative relation to the clutch member 22.

When the bar 4 moves upwardly, its first action is simply to uncoil the strap 24, and this strap is, therefore, not in tension with said bar until the latter has completed a substantial portion of its upward movement, sufficient, at least, to bring the knife 3 above the block of cheese A. Thereafter, and as the upward movement of the bar 4 continues, the strap 24, being in tension therewith, acts, through the agency of the clutch members 23 and 22, to turn the shaft 19 and to rotate the table 21.

It will be apparent that the degree of rotation of the table 1 depends upon the degree of upward movement of the bar 4 beyond the point where the strap 24 is first tensioned by the bar 4. The invention proposes means for indicating the degree of movement of the table 1 necessary to result in a slice of cheese of given weight or money value, which means, according to the invention, continuously operates during the movement of the table, to give an indication of value either in terms of weight or money, of the range of movement through which the table has passed. This value indicating or computing means comprises essentially an indicating finger 26 and a scale 27, said finger and said scale being relatively movable. As shown, the scale 27 is in the form of a tape, (Fig. 10) and is mounted upon a scale carrier 28, in the nature of a rotatable drum. This form of scale and scale carrier is preferred, because it is compact, and because it provides for a ready and accurate adjustment of the scale. The tape which constitutes the scale is shown in Fig. 10, and while this tape is, for convenience, referred to as the scale, it is, in fact, so divided as to embody a number of scales, each based on certain weight or money values. For example, a portion of the length of the scale may be devoted to a twenty pound cheese, and this portion may, in turn, be subdivided according to varying prices within a certain range, e. g., within a range of from twenty to thirty cents a pound. An adjoining portion of the scale will be devoted to a twenty-five pound cheese, and will be similarly subdivided as to the range of prices. Still a third portion may be devoted to a thirty pound cheese, and similarly subdivided. The mention of a cheese of particular weight in this connection is simply arbitrary and by way of example, as will be understood. By way of explanation, it may be assumed that the portion of the scale depicted in Fig. 10 is devoted to a twenty pound cheese, and that the upper subdivision illustrated is based on a price of twenty cents per pound, whereas the lower subdivision indicated is based on a price of thirty cents per pound, adjoining portions of the subdivision based on a price of twenty-five cents per pound being shown in each instance. For a division of the scale with relation to a particular weight of cheese, the spaces between the pound divisions will, of course, be uniform, regardless of the price, and these spaces will be subdivided variably, according to price. Thus, a pound division of that portion of the scale which is devoted to cheese at twenty cents per pound contains twenty subdivisions, each subdivision representing the value of a cent, and that portion of the scale which is devoted to cheese at thirty cents a pound is similarly divided into thirty subdivisions, each subdivision representing the value of a cent. While the intervals of the pound divisions are uniform for any given weight, regardless of the price, they vary proportionately with a variation of the weight, as will be obvious. Thus, in that portion of the scale which is devoted to a twenty pound cheese, the intervals between the pound divisions will be greater than the same intervals in that portion of the scale which is devoted to a twenty-five pound cheese, and less than the same intervals in that portion of the scale which is devoted to a fifteen pound cheese.

To provide for the adjustment of the scale, the following arrangement is preferably employed, by reason of its compactness, accessibility, and convenience. The drum 28 is made of two cup-shaped telescopic sections, of which the one, 28$^a$, is connected to the shaft 19 in a manner to be hereafter set forth, and the other, 28$^b$, fits over the section 28$^a$. The vertical walls of the sections of the drum serve as bearings for pins 29 and 30, the inner ends of which are removably fitted in openings in the vertical wall of the section 28$^a$, and the outer ends of which, projecting beyond the sections 28$^b$, carry operating knobs 31. The pins 29 and 30 are each formed with a longitudinal slot 32 which extends to the inner end thereof, and in which may be engaged the ends of the tape 27, the said tape being wound in opposite directions upon said respective pins. The sections 28$^a$ and 28$^b$ of the drum 28 are provided in the circumferential portions with alining slots 33 through which the lengths of the tape 27 are passed. In assembling the value indicating mechanism, the section 28$^b$ of the drum 28 is disengaged from the section 28$^a$, and the ends of the tape 27 are engaged in the slots 32 of the pins 29 and 30, and a bight of the tape is coiled around the peripheral surface of the drum section 28$^b$, the lengths of the tape being passed through the slots 33 of said drum section for this purpose. Thereafter, the drum section 28$^b$ is fitted on the drum section 28$^a$ and the pins 29 and 30 are turned to take up any slack in the tape. Assuming that a cheese weighing twenty pounds is placed on the table 1, an initial adjustment of the tape is made, with regard to the weight and the value of the cheese. To effect this adjustment, the operator turns the pins 29 and 30 simultaneously and in the same direction, so as to feed or move a continuous bight of the tape about the periphery of the drum, and this action is continued until the pointer 26 alines with the zero pound mark of that division of the scale which is devoted to a twenty pound cheese at the price at which the cheese is to be sold, e. g., twenty cents. Each monetary subdivision of a weight division of the scale may be marked off into any desired or arbitrary number of pounds, according to the average limits of sale. For example, each money value subdivision of a weight division of the tape may be divided for a three pound weight limit. This figure, of course, is simply selected for example. The other monetary divisions of a particular weight division of the scale may, of course, be marked off for a corresponding weight limit When the tape has been adjusted in the manner stated, e. g. so that the pointer 26 alines with the zero pound mark of the division of the scale which corresponds to the weight of the block of cheese used, and to the price at which the cheese may be sold on the occasion, no further adjustment or manipulation of the computing means is required until a block of cheese of different weight is placed on the table or until, assuming the weight of the cheeses used to be uniform, the market price changes.

It has been already stated that the drum section 28$^a$ is connected to the shaft 19. The connection employed is of such nature that said drum section will turn with said shaft when the latter is operated, and may, at the same time, "slip" upon the shaft when the latter is idle. The connections for this purpose preferably comprise a screw 34 which is threaded axially into the outer end portion of the shaft 19, passing loosely through the vertical wall of the drum section 28$^a$, and a leaf spring washer 35 which surrounds the screw 34, its end bearing frictionally against the vertical wall of the drum section 28$^a$, and its central portion bearing frictionally against the head of the screw 34. This connection enables the drum 28 to turn with the shaft 19, and to thus cause the tape to move with relation to the pointer 26, while, on the other hand, it permits said drum to turn with relation to or "slip" upon said shaft, when the tape is being reset or returned to its initial or zero position.

It will be apparent from the description thus far given that the operation of the handle 18 to raise the knife 3 will not only, as already stated, through the instrumentalities described, cause a corresponding rotation of the table 1, but it will also cause an operative movement of the drum 28, and therewith of the tape 27, so that the indications of the latter pass continuously across the pointer 26, and give a continuous reading of the value, either in terms of weight or money, of the range of movement imparted to the table 1. Toward the end by singleness of operation, the element by which the knife is actuated, and by which the operations already stated are carried out, is also used to reset the tape to its initial zero position, and the connections for this purpose, as shown, consist of a cord 36 and a sheave 37, which is integral or otherwise rigid with the vertical wall of the drum section 28$^a$. The cord 36 is coiled about the sheave 37 in a direction opposed to the direction of the winding of the strap 24, and one end of said cord is connected to said sheave or to the drum section 28$^a$, while the other end of said cord is connected, for example, to the pinion 14, the cord for this purpose passing through an opening 38 in the casing 16 and through an opening 39 in the pinion 14, its end being knotted or otherwise arranged against withdrawal from the opening 39.

The operation of the cutter, as a whole, should be readily apparent from the foregoing description. Assuming that the tape is set with regard to a block of cheese weighing twenty pounds, and selling at twenty cents per pound, and that a customer gives an order for a certain value of cheese: If the order be in terms of pounds, e. g., one pound, the operator raises the handle 18 so as to raise the knife, and to turn the table 1, and continues this movement until the finger 26 alines with the one pound indication on the scale. The movement of the crank 18 is then reversed, and the knife is forced downwardly, cutting off a slice of cheese which has a weight of one pound, and which corresponds to the order given by the customer. If, on the other hand, the customer gave the order in terms of money value, e. g., he requests fifteen cents' worth of cheese, the operator proceeds in the same manner as before, except that he arrests the movement of the crank 18 when the finger 26 alines with the first fifteen cent reading on the tape. It will be noted that in each of the examples described, but one operation is required to cut accurately either value of cheese requested, whether that value be stated in terms of weight or of money. During the downward movement of the knife, and about the time that the knife enters the block of cheese, the slack of the cord 36 is taken up by the rotation of the pinion 14, and as the downward movement of the knife continues, the cord acting on the sheave 37 will revolve the drum 28 so as to bring the scale to its initial zero position, the revolving movement of the drum in this instance being with relation to the shaft 19 and being permitted by the friction coupling connection already described between said drum and said shaft.

It has already been stated that the tension of the strap 24 is not completely taken up by the bar 4 until the knife 3 is above the block of cheese. This relation is provided in order that the crank 18 may be operated as many times as may be required to produce a rotation of the table for any value in excess of a single operation of said crank, and to produce the quantity requested in one cut. Thus, it may be assumed that a complete operative movement of the crank will turn the table sufficiently to set off a pound of cheese. This quantity will vary in accordance with the weight of the cheese, and is to be regarded merely by way of example. In such a case, if a purchaser requests three pounds of cheese, it is not necessary to make three separate cuts, and to thus deliver three pieces of cheese. On the other hand, the operator simply moves the crank 18 to a position where the knife is slightly above the block of cheese, and then reverses the movement of the crank, so as to raise the knife. This reversal of movement will result in another step of rotation of the table 1, and may be effected as many times as the quantity of cheese requested may demand. It will, of course, be understood that when the handle 18 is operated so as to lift the knife to a position wherein it is slightly above the block of cheese, the clutch member 23 will ride over the clutch member 22 and the spring 25 will keep the strap 24 in tension with the bar 4. This enables the successive reversals of the crank 18, so as to produce such step by step rotation of the table 1 as may be necessary to set off that portion of the cheese which corresponds to the amount requested when the order exceeds a pound, as in the example given.

It will be understood that no specific description herein contained is intended to put any limitation upon the scope of the appended claims, except such as may be necessary to an exposition thereof.

Having fully described my invention, I claim:

1. In a cheese cutter, in combination, a rotatable cheese carrying table, a knife coöperating with the table, means for operating the knife, means for determining the size of the slice to be cut and including a scale and an indicating finger coöperating therewith, the scale and the indicating finger being relatively movable, a shaft, gearing operatively connecting the shaft and the table, an operative connection between the shaft and the knife operating means, and an operative connection between the shaft and the movable element of the determining means.

2. In a cheese cutter, in combination, a rotatable cheese carrying table, a knife coöperating with the table, means for operating the knife, means for determining the size of the slice to be cut and including a scale and an indicating finger coöperating therewith, the scale and the indicating finger being relatively movable, a shaft, gearing operatively connecting the shaft and the table, an operative connection between the shaft and the knife operating means, an operative connection between the shaft and the movable element of the determining means, and a resetting connection between the movable element of the determining means and the knife operating means.

3. In a cheese cutter, in combination, a movable cheese carrying table, a knife coöperating therewith, a movable knife actuating element, a continuously operable value indicating means including a relatively movable scale and pointer, means for correlating the table, the movable part of the value indicating means, and the knife actuating element whereby operations thereof are produced in unison, the last named means including clutch connections which enable a reverse movement of the knife actuating element independently of the table, and a resetting connection between the movable part of the value indicating means and the knife actuating element.

4. In a cheese cutter, in combination, a movable cheese carrying table, a knife coöperating therewith, a movable knife actuating element, a shaft geared to the table, an operating connection between the shaft and the knife actuating element and including companion clutch parts whereby a movement of the knife actuating element in one direction causes a movement of said shaft and in the opposite direction is without effect on the shaft, a drum connected to the shaft and adapted to carry a scale, and a pointer which is traversed by the scale when the latter moves with the drum.

5. In a cheese cutter, in combination, a movable cheese carrying table, a knife coöperating therewith, a movable knife actuating element, a shaft geared to the table, an operating connection between the shaft and the knife actuating element and including companion clutch parts whereby a movement of the knife actuating element in one direction causes a movement of said shaft and in the opposite direction is without effect on the shaft, a drum adapted to carry a scale, a pointer which is traversed by the scale when the latter moves with the drum, a frictional connection between the drum and the shaft enabling the drum to be rotated by the shaft and also to be rotated free of the shaft, and a connection between the drum and the knife actuating element whereby when the latter moves without effect on the shaft, it resets the drum.

6. In a cheese cutter, in combination, a movable cheese carrying table, a knife coöperating therewith, knife operating means including a reciprocatory bar carrying the knife, a shaft geared to the table and having fixed and loose clutch members thereon, a strap connecting the loose clutch member and the bar, a spring to take up a portion of the slack of the strap, a drum adapted to carry a scale, and connected to the shaft, and a pointer which is traversed by the scale when the latter moves with the drum.

7. In a cheese cutter, in combination, a movable cheese carrying table, a knife coöperating therewith, knife operating means including a reciprocatory bar carrying the knife, a shaft geared to the table and having fixed and loose clutch members thereon, a strap connecting the loose clutch member and the bar, a spring to take up a portion of the slack of the strap, a drum adapted to carry a scale, a pointer which is traversed by the scale when the latter moves with the drum, a frictional connection between the drum and the shaft enabling the drum to be rotated by the shaft and also to be rotated free of the shaft, and a cord to reset the drum and operatively connected thereto and to a movable element of the knife operating means.

8. In a cheese cutter, in combination, a movable cheese carrying table, a knife coöperating therewith, knife operating means including a reciprocatory bar having a rack face, a hollow standard in which the bar works, a pinion engaging the rack face and carrying a crank handle, a shaft journaled in the lower portion of the standard and geared to the table, fixed and loose clutch members on the shaft, a strap connecting the loose clutch member and the bar, and a spring to take up a portion of the slack of the strap.

9. In a cheese cutter, in combination, a movable cheese carrying table, a knife coöperating therewith, knife operating means including a reciprocatory bar having a rack face, a hollow standard in which the bar works, a pinion engaging the rack face and carrying a crank handle, a shaft journaled in the lower portion of the standard and geared to the table, fixed and loose clutch members on the shaft, a strap connecting the loose clutch member and the bar, a spring to take up a portion of the slack of the strap, and value indicating means including a relatively movable scale carrier and pointer, the movable element of the value indicating means being operatively connected to the shaft.

10. In a cheese cutter, in combination, a movable cheese carrying table, a knife coöperating therewith, knife operating means including a reciprocatory bar having a rack face, a hollow standard in which the bar works, a pinion engaging the rack face and carrying a crank handle, a shaft journaled in the lower portion of the standard and geared to the table, fixed and loose clutch members on the shaft, a strap connecting the loose clutch member and the bar, a spring to take up a portion of the slack of the strap, a scale carrying drum operatively connected to the shaft, and a pointer with relation to which the drum is rotatable.

11. A cheese cutter having a movable cheese carrying table and a value indicating means including a pointer, a scale calibrated to different weight and money values, a scale carrier movable simultaneously with the table, and means for initially setting the scale on the carrier and with relation to the pointer, according to the original weight of the block of cheese and the sale price thereof.

12. A cheese cutter having value indicating means which comprises a relatively movable pointer and drum, the latter having a transverse peripheral slot and inclosed winding pins, and a tape calibrated to constitute a scale and having a bight thereof wound on the periphery of the drum, the lengths of the tape passing through the slot and their ends being connected to the winding pins.

13. A cheese cutter having value indicating means which comprises a relatively movable pointer and drum, the latter including two cup-shaped sections having alining peripheral slots and fitted, one over the other, winding pins journaled in the flat walls of the drum sections, and a tape calibrated to constitute a scale and having a bight thereof wound on the periphery of the drum, the lengths of the tape passing through the slots and their ends being connected to the winding pins.

14. In a cheese cutter, in combination, a movable cheese carrying table, a knife coöperating therewith, a movable knife actuating element, a continuously operable value indicating means including a relatively movable scale and pointer, and means in correlation with the table, the movable part of the value indicating means, and the knife actuating element whereby the movement of the knife away from the table is accompanied by an actuation of the scale and a movement of the table, the last named means including a shaft which forms a connection between the table and the movable part of the value indicating means, and a clutch connection between said shaft and the knife actuating element and which enables a reverse movement of the knife actuating element independently of the table.

15. In a cheese cutter, in combination, a movable cheese carrying table, a knife coöperating therewith, value indicating means continuously operable during the movement of the table to indicate the degree of movement of the table necessary to set off a portion of cheese having a predetermined value, a shaft arranged under the table and connected to the value indicating means, gear connections between the shaft and the table to operate the latter from the former, a knife actuating element operable to move the knife toward and away from the table, and connections between the knife actuating element and said shaft whereby the movements of the knife actuating element are accompanied by actuations of the value indicating means and movements of the table.

16. A cheese cutter comprising a movable cheese carrying table, a knife coöperating therewith, a knife actuating element, a value indicating means, a shaft operable to actuate the value indicating means, gearing connecting the shaft and the table and providing for a movement of the latter, and other connections between the shaft and the knife actuating element to provide for a movement of the shaft in accordance with a certain movement of the knife actuating element.

17. A cheese cutter comprising a movable cheese carrying table, a knife coöperating therewith, a knife actuating element, a value indicating means, a shaft arranged under the table and operable to actuate the value indicating means, gearing connecting the shaft and the table and providing for a movement of the latter, and other connections between the shaft and the knife actuating element to provide for a movement of the shaft in accordance with a certain movement of the knife actuating element.

18. A cheese cutter comprising a movable cheese carrying table, a knife coöperating therewith, a knife actuating element, a value indicating means, a shaft arranged under the table and operable to actuate the value indicating means, the latter being arranged at one end of the shaft, gearing connecting the shaft and the table and providing for a movement of the latter, and other connections between the shaft and the knife actuating element to provide for a movement of the shaft in accordance with a certain movement of the knife actuating element, the last named connections including elements which are arranged on the shaft between the value indicating means and the table.

In testimony whereof I have hereunto set my hand in presence of two subscribing witnesses.

ISAAC EDWARD LEE.

Witnesses:
 CHAS. S. HYER,
 JOHN S. POWERS.

Copies of this patent may be obtained for five cents each, by addressing the "Commissioner of Patents, Washington, D. C."